Patented Jan. 6, 1925.

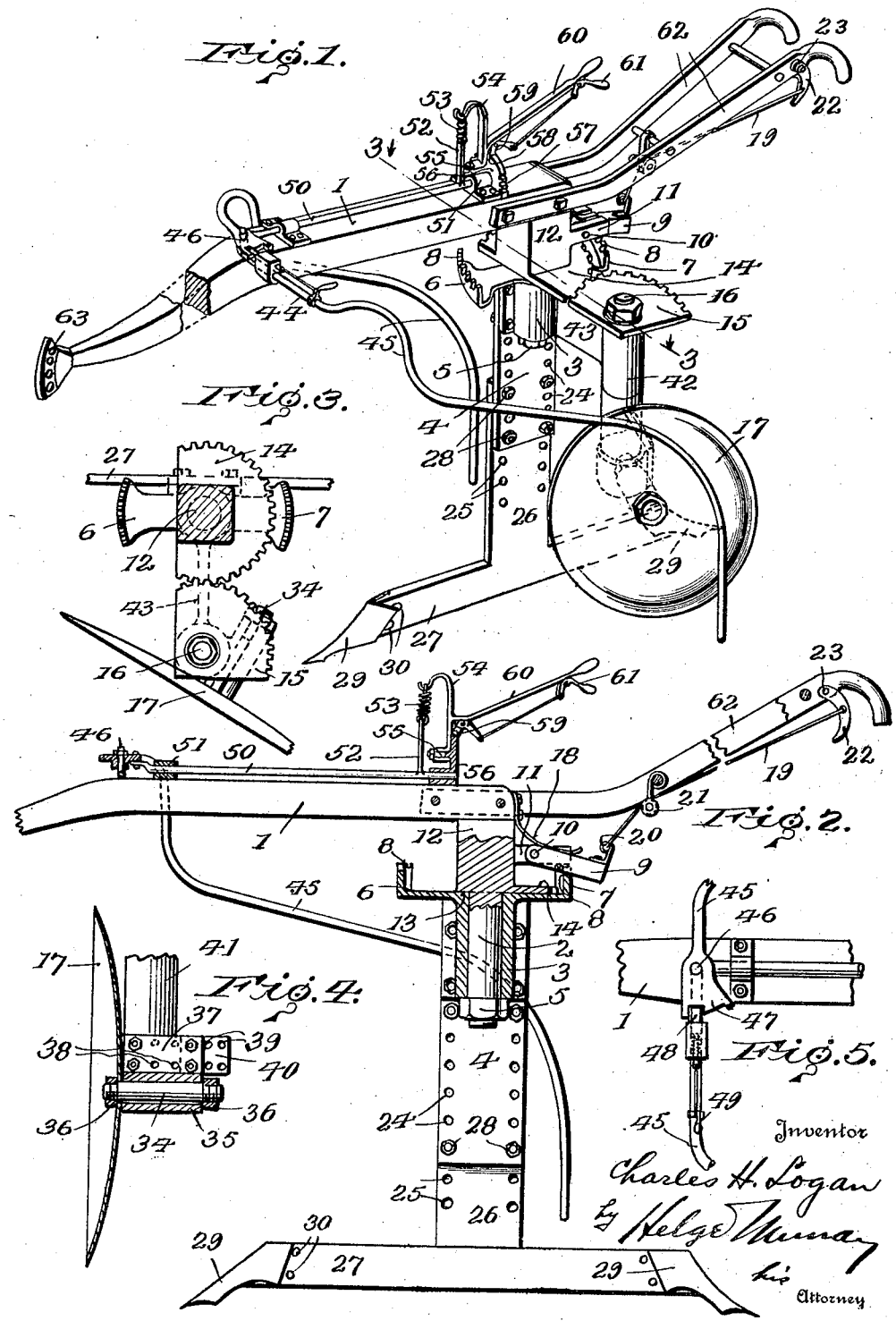
Jan. 6, 1925.
C. H. LOGAN
REVERSIBLE RUBBISH BURYING TURNING PLOW
Filed Feb. 10, 1921
1,521,895

1,521,895

UNITED STATES PATENT OFFICE.

CHARLES H. LOGAN, OF MONETTE, ARKANSAS, ASSIGNOR OF ONE-FOURTH TO HELGE MURRAY AND ONE-THIRD TO HERBERT F. GROVES, BOTH OF WASHINGTON, DISTRICT OF COLUMBIA.

REVERSIBLE RUBBISH-BURYING TURNING PLOW.

Application filed February 10, 1921. Serial No. 443,912.

*To all whom it may concern:*

Be it known that I, CHARLES H. LOGAN, a citizen of the United States of America, residing at Monette, in the county of Craighead, State of Arkansas, have invented certain new and useful Improvements in Reversible Rubbish-Burying Turning Plows, of which the following is a specification.

This invention relates to plows, and more particularly stated contemplates the production of a reversible rubbish burying and turning plow.

An object of the present invention is to produce a plow having a central standard or plow share support about which the beam and other associated devices can be easily turned.

Another object of the invention is the production of a reversible plow having a common plow share bar and relatively fixed shares, and a cooperating disk capable of being shifted into associated mold board position upon each swinging or reversal movement of the plow beam.

A further object of the present invention is to provide a reversible plow having subsoiling and rubbish burying devices.

A still further object of the invention is to produce a comparatively simple and durably constructed plow which can be easily handled by one man and readily converted into a, right or left hand plow as will be understood.

With these and other objects in view the invention further consists in the arrangement and construction of the several parts hereinafter described and pointed out in the appended claims.

In the accompanying drawings illustrating an embodiment of my invention, and wherein similar reference characters designate corresponding parts in the several views:

Fig. 1 is a perspective view of the plow;
Fig. 2 is a sectional elevation thereof;
Fig. 3 is a detail horizontal sectional view on the line 3—3 of Fig. 1;
Fig. 4 is a detail vertical sectional view through the disk mold board and its connection; and
Fig. 5 is a detail plan view illustrating the adjustable connection of the rubbish burying arms.

The present invention has been designed with a view to embodying in an agricultural implement features for treating the soil and preserving the fertility of same by properly locating the furrows and burying the rubbish containing humus as may be contained for example in cotton stalks. The invention comprises among other things a centrally located adjustable standard to the ends of which are connected plow shares; a movable mold board in the form of a disk; and means for permitting the rotation of the beam of the plow about the standard thereby shifting the aforesaid disk for cooperative action with the respective plow shares.

Referring to the drawings, the beam 1 may be of usual construction and is provided with a depending spindle 2 at the rear end thereof. The spindle 2 is rotatably mounted in a bearing 3 formed on the supporting standard 4. The nut 5 threaded upon the lower end of the spindle 2 serves to retain the spindle in the bearing as will be understood.

Projecting from the upper end of the standard 4 and bearing 3 are segments 6 and 7. These segments are diametrically located, the teeth 8 of which are adapted to receive a locking dog 9. The locking dog 9 is pivoted at 10 to a bracket 11. The bracket 11 extends from an intermediate body portion 12 provided between the beam 1 and the spindle 2. As shown the body portion 12 and the spindle or shaft 2 are formed integral. A shoulder 13 is formed on this intermediate body portion 12 and is designed to bear against the upper surface of the segments 6 and 7. Secured to or formed integral as shown with the body portion 12 is a segmental gear 14, the teeth of which are designed to mesh with a similar segmental gear 15, secured to the upper end of the shaft or spindle 16, to the lower end of which latter is connected the disk 17, to be presently described.

The locking dog 9 is shown as engaging the teeth 8 of the segment 7 and is held in place by means of a spring 18 as best shown in Fig. 2. An operating device in the form of a flexible rod or cable 19 is attached at 20 to the end of the locking dog 9. This cable extends over a roller 21 provided intermediate the handles of the plow and extends rearwardly to a controlling finger lever 22. The lever 22 is pivoted at 23 to one of the handles, and in proximity to the hand gripping portion thereof. It will be seen from this construction that upon moving the lever 22 toward the handle grip the locking dog 9 will be lifted against the tension of the spring 18 clear of the segment 7. When in this released position the beam 1 is free to move about the standard 4 as will be hereinafter further referred to.

The standard 4 is in the form of a plate having a series of perforations 24 therein arranged to register with a series of similar perforations 25 formed in the upstanding portion 26 of the plow bar 27. Bolt and nut connections 28 serve to adjustably secure the standard 4 and upstanding portion 26 together as shown, thereby regulating the height of the plow as will be understood.

At each end of the plow bar 27 a plow share 29 is provided. This plow share is attached by means of bolts 30 to the ends of the bar 27, the bolts 30 being countersunk. Various forms of plow shares may be secured to the ends of the bar 27 and I do not limit myself to the exact form shown herein.

The disk 17 hereinbefore mentioned is designed to serve as the mold board of the plow, and as shown is mounted upon the end of a relatively short shaft 34 positioned in the bearing 35. The ends of the shaft are preferably reduced and threaded and receive retaining nuts 36, (see Fig. 4). A plate 37 extends from the bearing 35 and is provided with a series of holes 38 adapted to adjustably register with a series of openings 39 formed in a plate 40. The plate 40 is carried by an extension 41 through which the shaft 16 passes. The shaft 16 is also mounted in the bearing 42 formed on one end of the web 43 forming the intermediate connection between the plow standard 4 and the disk support. By this construction the disk can be adjusted in a horizontal plane toward and away from the plow shares. The vertical adjustment of the standard also provides for the substitution of larger disks in making broader furrows with greater depth, as will be understood.

A rubbish burying device 44 is carried by the beam 1, and comprises laterally and longitudinally extending arms 45. The arms 45 are positioned for engagement with the growth frequently found upon the soil, and serves to turn the same over into the furrow as will be understood.

The arms 45 are adjustably pivoted at 46, one of said arms having a notched segment 47 and the other of said arms being provided with an engaging latch 48. The latch 48 is retractible by means of the operating device 49, thereby serving to position the arms 45 at varying distances from the beam 1. The rubbish burying arms 45 are also movable toward and away from the disk 17.

The means for effecting this rocking movement comprises a shaft 50 secured to the beam 1. A projecting arm 52 extends upwardly from the shaft 50, and has secured thereto one end of a spring 53. The opposite end of the spring 53 is attached to an overhanging rocker arm 54 movably mounted upon a stub shaft 55. The stub shaft 55 projects from the upstanding plate 56 formed integral with one of the bearings 51 as shown. The plate 56 is provided with a series of notches 57 at either side thereof. A central notch 58 is also formed in said plate and is designed to receive a locking dog 59 carried by the operating handle 60. A hand gripping device 61 is provided on the handle 60 and serves to release the locking dog 59 and permit of its engagement with the respective notches 57 as will be understood.

The rubbish burying device is operated by moving the handle 60 to either side of the plow beam, thereby rocking the upstanding and overhanging arm 54. Through the spring connection 53 and extension 52 the shaft 50 is rotated, and the respective rubbish burying arms 45 are either brought toward or moved away from the disk 17 as will be understood. The engagement of the locking dog 59 with either set of notches 57 serves to retain the rubbish burying arms in their adjusted position. The foregoing construction of rubbish burying device forms no part of my present invention, the same being set forth in U. S. Letters Patent No. 1,264,101, granted to me April 23, 1918.

The usual handles 62 are attached to the beam 1, and a suitable clevis connection 63 may be provided at the other end of the beam.

In operation, and more especially when it is desired to reverse the plow at the end of a furrow, the locking dog 9 is released from the segment 7, thereby permitting the beam 1 and more especially the pintle 2 to rotate in the bearing 3. As the beam 1 is swung the segmental gear 14 serves to revolve the meshing segmental gear 15, and shift the disk 17. When the beam has been swung the desired distance, the locking dog 9 is dropped into the teeth 8 of the segment 6, and the plow is in reversed position for producing the succeeding furrow. The rubbish burying device is adjusted according to the growth of the soil as will be understood.

From the foregoing construction it will be seen that I have produced a readily usable right or left hand plow in which the disk 17 becomes effective as the mold board when moved in either direction. It will also be obvious that a minimum resistance of the trailing plow share is afforded and the usual complicated and retarding portions of the now known devices have been eliminated.

Various changes in the form and construction of the several parts may be resorted to and I do not limit myself to the exact construction herein disclosed.

I claim:

1. A reversible plow including in combination a beam, means for pivotally mounting the beam, said means including a standard, plow shares provided on said standard, a disk associated with said plow shares, said plow shares being vertically adjustable with relation to the beam and disk, and means for shifting said disk with relation to the plow shares upon reversing the plow.

2. A reversible plow including in combination, a beam, means pivotally mounting the beam involving a standard, plow shares provided on said standard, a disk associated with said plow shares, said shares being vertically adjustable with relation to the beam and disk, means for adjusting said disk toward and away from said standard, and means for shifting said disk with relation to the plow share upon reversing the plow.

3. A reversible plow including in combination, a beam having a depending shaft, a plow standard, a bracket connected to said standard having a bearing therein for said shaft, a plow bar provided with oppositely disposed plow shares, a movable disk associated with said plow shares, a shaft for moving said disk, a bearing formed in said bracket for the last named shaft, said bearing being transversely arranged to one side of the plow beam, means including meshing segments carried by said shafts for shifting the disk upon reversing the plow, and means including oppositely disposed notched segments projecting from the aforesaid bracket and a locking dog for holding the parts in fixed position.

4. A reversible plow including in combination, a beam, having a depending shaft, an adjustable plow standard formed of perforated plate sections, bolts connecting said sections, a plow bar provided with oppositely disposed plow shares connected to the lowermost section, a bracket connected to the uppermost section, said bracket being formed with a bearing for said depending shaft, another bearing in said bracket, a shaft in said last named bracket provided at its lower end with a disk, and means including a segment carried by the beam for rotating said last named shaft and shifting said disk upon reversing the plow.

In testimony whereof I affix my signature.

CHARLES H. LOGAN.